United States Patent
Szpara et al.

(10) Patent No.: US 9,835,197 B2
(45) Date of Patent: Dec. 5, 2017

(54) PINION ASSEMBLY PRELOADING SYSTEM

(71) Applicant: FORD GLOBAL TECHNOLOGIES, LLC, Dearborn, MI (US)

(72) Inventors: Peter Alexander Szpara, Livonia, MI (US); Timothy John Reed, Kalamazoo, MI (US); Troy Smith; Julie Anne Sunstein, Ann Arbor, MI (US); Wayne Bennett Uhrick, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 371 days.

(21) Appl. No.: 14/748,421

(22) Filed: Jun. 24, 2015

(65) Prior Publication Data

US 2015/0292554 A1 Oct. 15, 2015

Related U.S. Application Data

(62) Division of application No. 13/213,125, filed on Aug. 19, 2011, now Pat. No. 9,091,298.

(51) Int. Cl.
| | |
|---|---|
| *F16C 43/00* | (2006.01) |
| *F16C 25/06* | (2006.01) |
| *F16C 19/54* | (2006.01) |
| *F16H 57/022* | (2012.01) |
| *F16H 57/02* | (2012.01) |
| *F16C 19/18* | (2006.01) |

(52) U.S. Cl.
CPC ............ *F16C 25/06* (2013.01); *F16C 19/548* (2013.01); *F16C 19/182* (2013.01); *F16C 2229/00* (2013.01); *F16C 2361/61* (2013.01); *F16H 2057/0221* (2013.01); *F16H 2057/02043* (2013.01); *Y10T 29/49776* (2015.01); *Y10T 29/53061* (2015.01)

(58) Field of Classification Search
CPC ...... F16C 25/06; F16C 19/548; F16C 19/182; F16C 2229/00; F16C 2361/61; Y10T 29/49776; Y10T 29/53061; Y10T 29/49766; Y10T 29/29767; Y10T 29/497; F16H 2057/02043; F16H 2057/0221; F16H 2057/0227; F16H 2048/423
See application file for complete search history.

(56) References Cited

U.S. PATENT DOCUMENTS

| | | |
|---|---|---|
| 2,018,188 A | 10/1935 | Padgett et al. |
| 3,308,682 A | 3/1967 | Puidokas |
| 3,310,999 A | 3/1967 | Griffith |
| 3,323,844 A | 6/1967 | Hedstrom |
| 4,150,468 A * | 4/1979 | Harbottle ............... F16C 19/364 29/898.09 |
| 4,179,786 A * | 12/1979 | Eshghy .................. B25B 23/14 173/183 |
| 5,125,156 A | 6/1992 | Witte |
| 5,386,630 A | 2/1995 | Fox |

(Continued)

*Primary Examiner* — Jun Yoo

(74) *Attorney, Agent, or Firm* — James Dottavio; MacMillan, Sobanski & Todd, LLC

(57) ABSTRACT

The present disclosure relates to pinion assembly preloading systems and methods of operation. Disclosed are systems including a press actuator that applies an axial force against a pinion assembly; a force sensor that measures a reaction force at the pinion assembly; and a method of controlling the press actuator according to a change in the reaction force.

18 Claims, 8 Drawing Sheets

(56) References Cited

U.S. PATENT DOCUMENTS

| | | |
|---|---|---|
| 5,579,570 A | 12/1996 | Bonvallet |
| 5,620,388 A | 4/1997 | Schlegelmann et al. |
| 6,000,134 A | 12/1999 | Jerraid |
| 6,088,910 A | 7/2000 | Jerraid |
| 6,202,306 B1 | 3/2001 | Miyazaki |
| 6,364,803 B1 | 4/2002 | Barnholt et al. |
| 6,418,613 B1 | 7/2002 | Rode |
| 6,446,339 B2 | 9/2002 | Takamizawa et al. |
| 6,487,775 B2 | 12/2002 | Rode |
| 6,662,449 B2 | 12/2003 | Rode |
| 6,684,506 B2 | 2/2004 | Rode |
| 6,736,544 B1 | 5/2004 | DeWald |
| 6,824,489 B2 | 11/2004 | Jacob et al. |
| 6,868,609 B1 | 3/2005 | Nahrwold et al. |
| 7,251,892 B2 | 8/2007 | Strait |
| 7,346,985 B1 | 3/2008 | Strait |
| 7,350,977 B2 | 4/2008 | Fukuda et al. |
| 8,342,039 B2 | 1/2013 | Wickens |
| 8,650,757 B2 | 2/2014 | Rode |
| 2002/0040526 A1 | 4/2002 | Beduhn et al. |
| 2002/0124407 A1 | 9/2002 | Ullom |
| 2004/0213493 A1 | 10/2004 | Takamizawa et al. |
| 2008/0305910 A1 | 12/2008 | Brasile et al. |
| 2013/0276505 A1 | 10/2013 | Kitai |

* cited by examiner

US 9,835,197 B2

PINION ASSEMBLY PRELOADING SYSTEM

CROSS REFERENCE TO RELATED APPLICATIONS

The present patent application claims the benefit of and is a divisional of U.S. patent application Ser. No. 13/213,125, filed Aug. 19, 2011, which is incorporated herein by reference.

TECHNICAL FIELD

The present disclosure relates to pinion assemblies that can be used in vehicle drive axles and preloading systems for the pinion assemblies.

BACKGROUND

Conventional drivelines for automotive vehicles include a driveshaft that is connected to a driven pinion. A drive pinion includes a pinion shaft that is journaled by a pair of axially spaced bearings. These two bearings are separated by a spacer. During vehicle operation driveline vibrations, gear separation forces, or unbalancing forces can occur within the drive pinion which cause deflection in the pinion assembly components. Therefore, it is desirable to preload pinion assembly components in a driveline differential in order to accomplish target NVH functionality and durability.

Different methods exist within the art for preloading pinion bearing assemblies used in driveline differentials. Bearing pre-load is traditionally set by monitoring a maximum rotational drag torque on the bearing assembly while tightening the distance between bearings. With this method the expected drag torque levels for a 5-9 kN pre-load may be in the 1.7-2.3 Nm torque range. However, using drag torque to decipher preloading has its detriments. For example, drag torque resulting from loading varies depending on the level of rust inhibitor used, lubrication provided, whether or not a seal interface drag is used, and ambient temperature. Additionally, angular contact ball bearings (or "ACBBs"), with reduced drag for fuel efficiency have expected drag torque levels in the range of 0.21-0.23 Nm. This is a significantly reduced level of drag torque as compared to 1.7-2.3 Nm. Accordingly, with ACBBs it is much more difficult to measure the reduced drag or set preloading.

U.S. Pat. No. 7,251,892 titled "Bearing Assembly Spacer Adjustable System and Method for Adjusting a Spacer" teaches the use of a spacer adjustment system having a preloading regulator that controls preloading according to the deformation desired, using electrical contacts between a first and second portion of the spacer to measure a travelled distance. This system, however, relates to spacer adjustment instead of preloading for the entire pinion assembly. In an assembly, the displacement for target preload can vary depending upon the elastic modulus of each component.

Therefore, it is desirable to have pinion assembly preloading systems (and methods for the same) that preload the entire assembly and do not require the use of a measured drag torque.

SUMMARY

The present disclosure addresses one or more of the above-mentioned issues. Other features and/or advantages may become apparent from the description which follows.

According to one exemplary embodiment, a pinion assembly preloading system, includes: a press actuator configured to apply an axial force against a pinion assembly; a force sensor configured to measure a reaction force at the pinion assembly; and a controller configured to control the press actuator according to a change in the reaction force.

According to another exemplary embodiment, a pinion assembly preloading system, includes: a press actuator configured to apply an axial force against a pinion assembly; a force sensor configured to measure a reaction force at the pinion assembly; a position sensor configured to measure a displacement in a pinion assembly during loading; and a controller configured to plot the reaction force versus displacement and control the press actuator according to a slope of the plot.

According to another exemplary embodiment, a method of preloading a pinion assembly, includes: applying an axial force to a pinion assembly; assessing a reaction force at the pinion assembly; assessing a bearing assembly displacement; and ceasing application of the axial force based on a change in the reaction force.

One advantage of the present teachings is that they disclose a pinion assembly preloading system that preloads the entire pinion assembly and does not require the use of a measured drag torque. Also advantageously disclosed is a method of preloading a pinion assembly that likewise does not require the use of a measured drag torque to indicate bearing preloading.

Another advantage of the present disclosure is that it teaches a system that uses direct placement and reaction force—rather than drag torque—to derive bearing loading, thus enabling the implementation of bearings having relatively low spin loss and higher efficiency, such as angular contact ball bearings. These bearings result in less parasitic losses and increased vehicle fuel efficiency. Moreover, the strength tolerances for pinion assemblies can be more readily ascertained with the implementation of examples in the present disclosure.

The invention will be explained in greater detail below by way of example with reference to the figures, in which the same reference numbers are used in the figures for identical or essentially identical elements. The above features and advantages and other features and advantages of the present invention are readily apparent from the following detailed description of the best modes for carrying out the invention when taken in connection with the accompanying drawings. In the figures:

DETAILED DESCRIPTION

Figure 1:
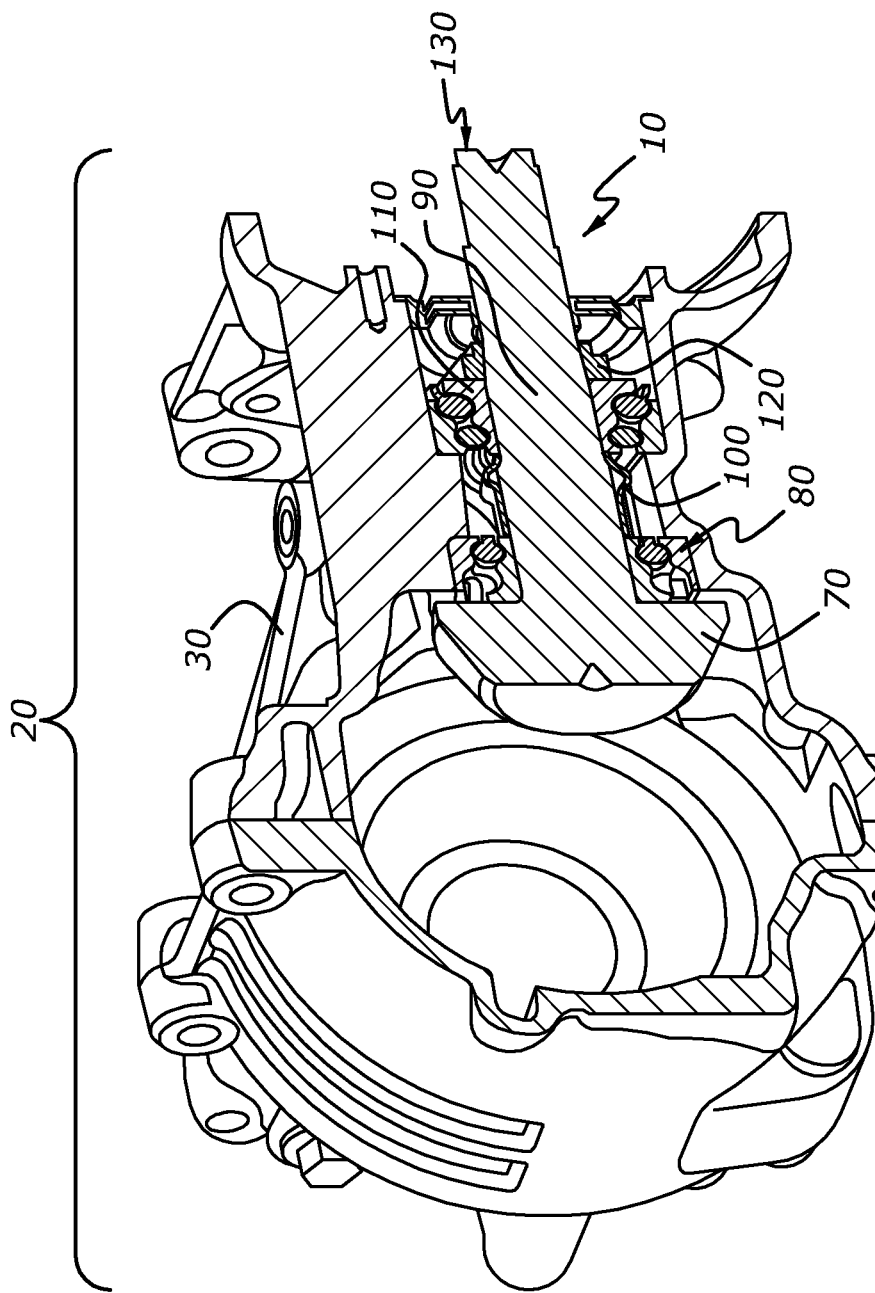
FIG. 1 is a perspective view of a partial cross-section of a driveline differential having a pinion assembly incorporated therein.

Referring to the drawings, wherein like characters represent examples of the same or corresponding parts throughout the several views, there are shown pinion assembly preloading systems. The systems are configured to preload pinion bearing assemblies by applying an axial load and measuring a reaction force and displacement. Loading is ceased based on changes in the reaction force or load. The systems include a controller or micro-controller that has closed-loop operating logic configured to apply loading according to a change in the reaction force. Pinion assembly loading is calculated according to a regression equation. For example, in one embodiment, the pinion assembly is sufficiently preloaded when the change in reaction force is equal to the sum of the spacer preload minus the bearing-race preload minus a constant, multiplied times a multiplier. The spacer preload and bearing-race preload are identified by monitoring the rate of change between displacement and reaction force during loading.

The systems are configured to continue loading the pinion assemblies until a predetermined preloading is achieved at the pinion assembly. The shown pinion assemblies include a spacer interspersed between two bearings placed at each end of the spacer. In other embodiments, there is no spacer between the pinion bearings or the spacer is interspersed between one pinion bearing and a shoulder on the pinion stem. The illustrated bearings are angular contact ball bearings. Other types of bearings can be used with the preloading systems including, e.g., tapered roller bearings.

In some embodiments, the system has a controller with closed-loop operating logic configured to apply loading according to a reaction force versus bearing displacement plot. Several points on the force versus displacement plot can be used to indicate spacer preload, bearing-race fit preload and adequate bearing preloading. For example the slope of the displacement versus reaction curve plot and/or changes in slope of the curve can indicate these values. In this manner, the disclosed pinion assembly preloading systems do not require the use of a measured drag torque to indicate adequate preloading.

The disclosed pinion bearing assemblies are configured for use with drivelines for automotive vehicles having a differential. Any type of tapered roller or angular contact ball bearings, however, can be used with the preloading systems and methods.

Referring now to FIG. 1, there is shown therein an exemplary pinion assembly 10 (or pinion bearing assembly) in a driveline axle carrier 20. The axle carrier 20 can be configured for use in any automotive driveline. Included in an axle carrier housing 30 is a pinion head 70 of the pinion 10. The pinion head 70 reacts against a ring gear that is attached to a differential (not shown). A pinion head bearing assembly or head bearing 80 is loaded into the axle carrier housing 30 proximate the head 70 of the pinion. In this embodiment, the head bearing 80 is an angular contact ball bearing (or ACBB) journaled onto a pinion shaft or race 90. The ACBB has an inner and outer race as shown. A collapsible spacer 100 is interspersed between the head bearing 80 and a tail bearing 110, which in this embodiment, is also an ACBB. A portion of the pinion assembly shaft 90 is threaded so that a pinion nut 120 can be tightened and fitted at the tail end 130 of the pinion assembly to a position adjacent tail bearing 110. During operation the pinion assembly 10 sees axial vibration, torque and other forces along the pinion shaft 90. In order to mitigate deflection due to system vibration the pinion assembly 10 can be preloaded beyond the elastic state of pinion assembly component(s) (e.g., the spacer 100).

Figure 2:
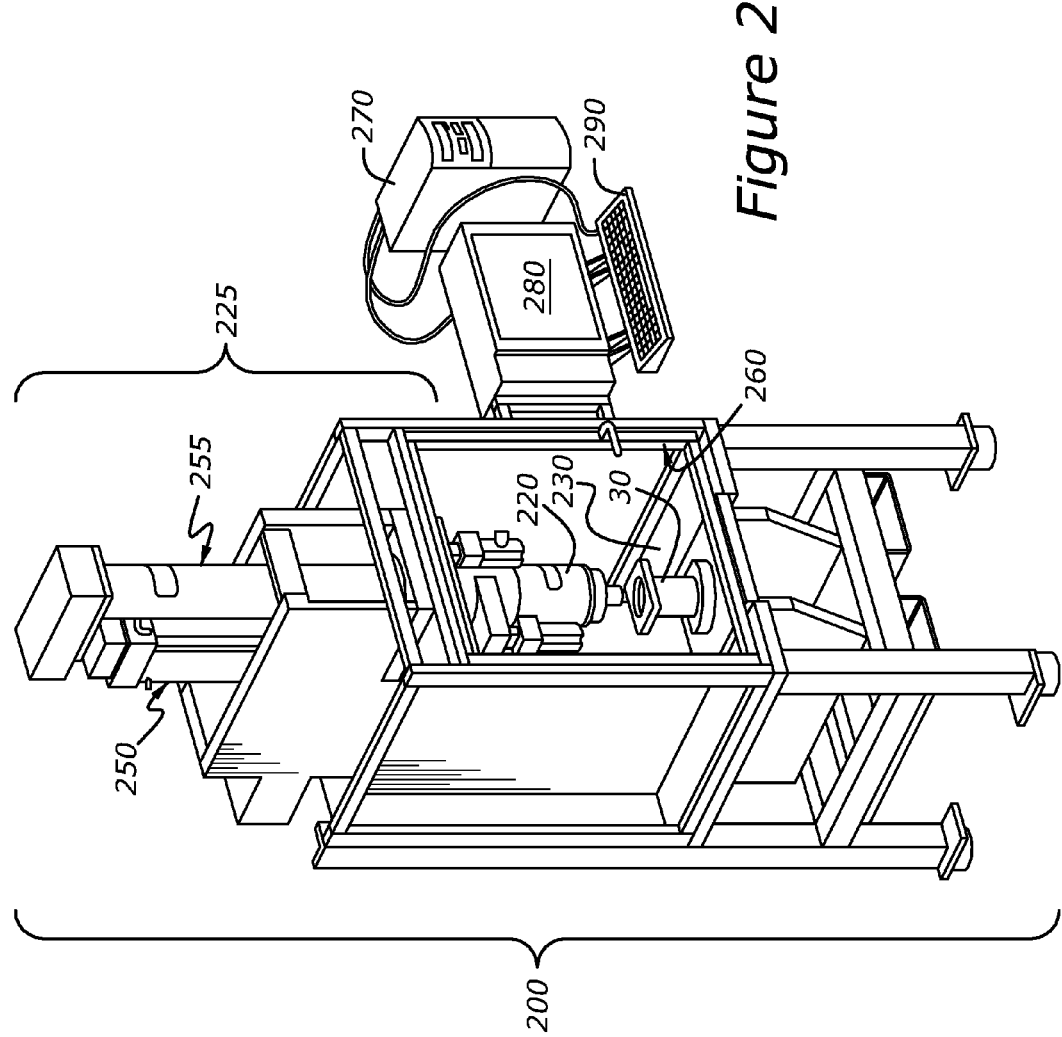
FIG. 2 is a perspective view of a pinion assembly preloading system according to one exemplary embodiment.
Figure 3:
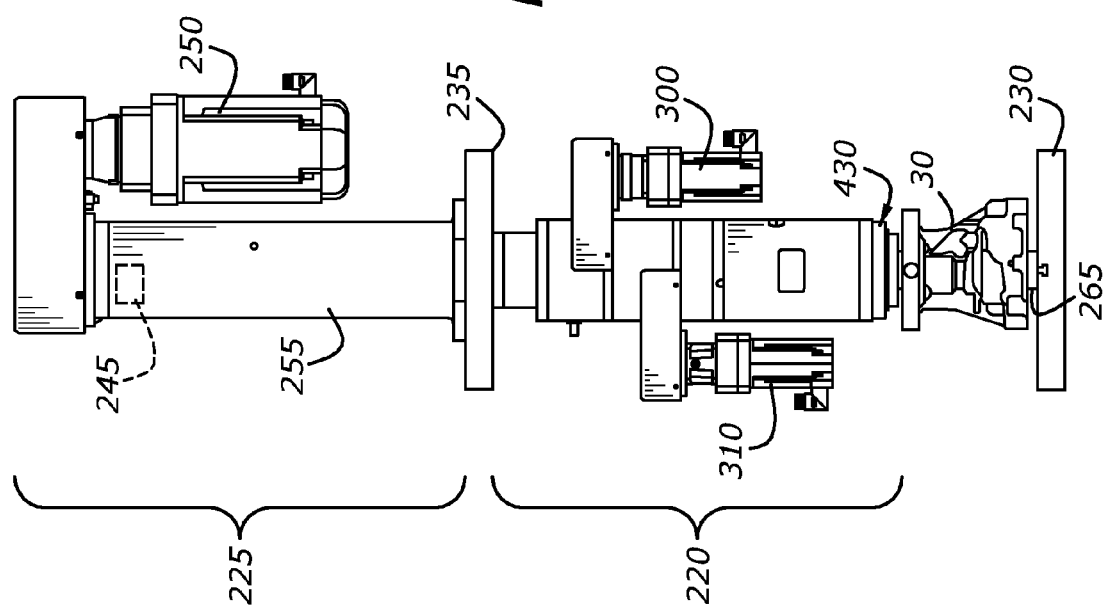
FIG. 3 is a front view of a portion of the pinion assembly preloading system of FIG. 2.
Figure 4:
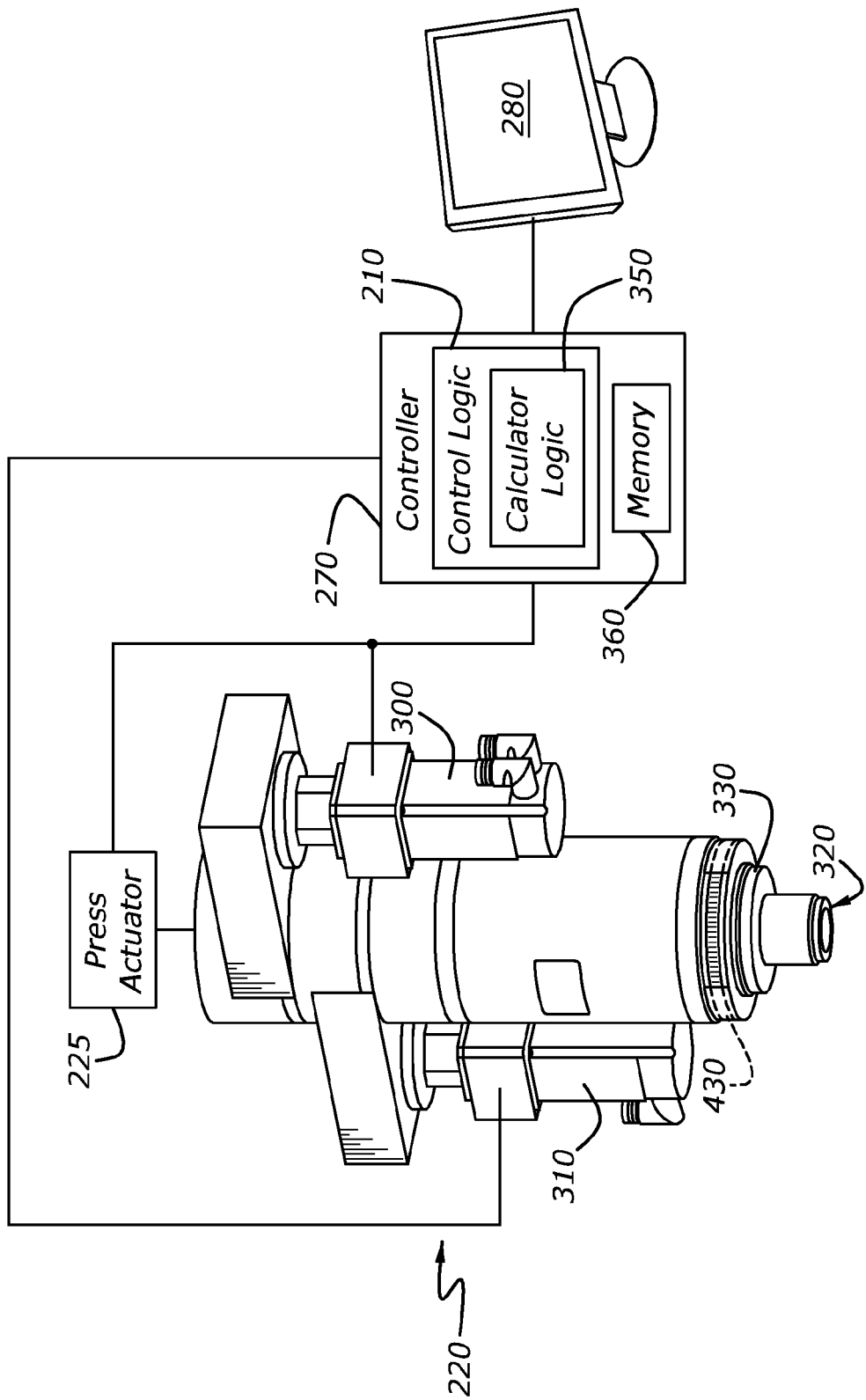
FIG. 4 is a perspective view of the end tooling in the system of FIGS. 2-3.

There is shown in FIGS. 2-4, a pinion assembly preloading system 200. The system 200 includes control logic 210 (e.g., as shown in FIG. 4) configured to continue loading a pinion assembly until a predetermined change in reaction force is achieved at one end of the pinion assembly. An enclosure with access door 260 surrounds the action point of the pinion assembly preloading system 200.

The system 200 includes a press actuator assembly 225, as shown in FIG. 3, configured to apply a linear force to one end of the pinion assembly. The press actuator assembly 225 includes a ball screw press ram enclosed in tubing 255. A servo motor 250 is linked to the ball screw press ram. A controller, e.g., 270 as shown in FIGS. 2 and 4, can be wired or wirelessly linked to motor to control the press actuator assembly 225. A position sensor 245, in this case a ball screw positional encoder, is included within the tubing housing 255. The position sensor 245 is included in the press actuator to measure displacement between each bearing. The sensor 245 is configured to count the revolutions of the drive screw in the press actuator to determine distance travelled (or displacement).

The press actuator assembly 225 is fitted with an end tooling or end tooling assembly 220 as shown in FIGS. 2-4. Between the end tooling assembly 220 and the press actuator assembly 225 is a press system top load reaction plate 235. At the other end of the end tooling 220 a press system bottom load reaction base 230 is provided. A carrier housing 30 holds the pinion assembly therein. A pinion head load reaction tool 265 is coupled to the reaction base 230.

Figure 5:
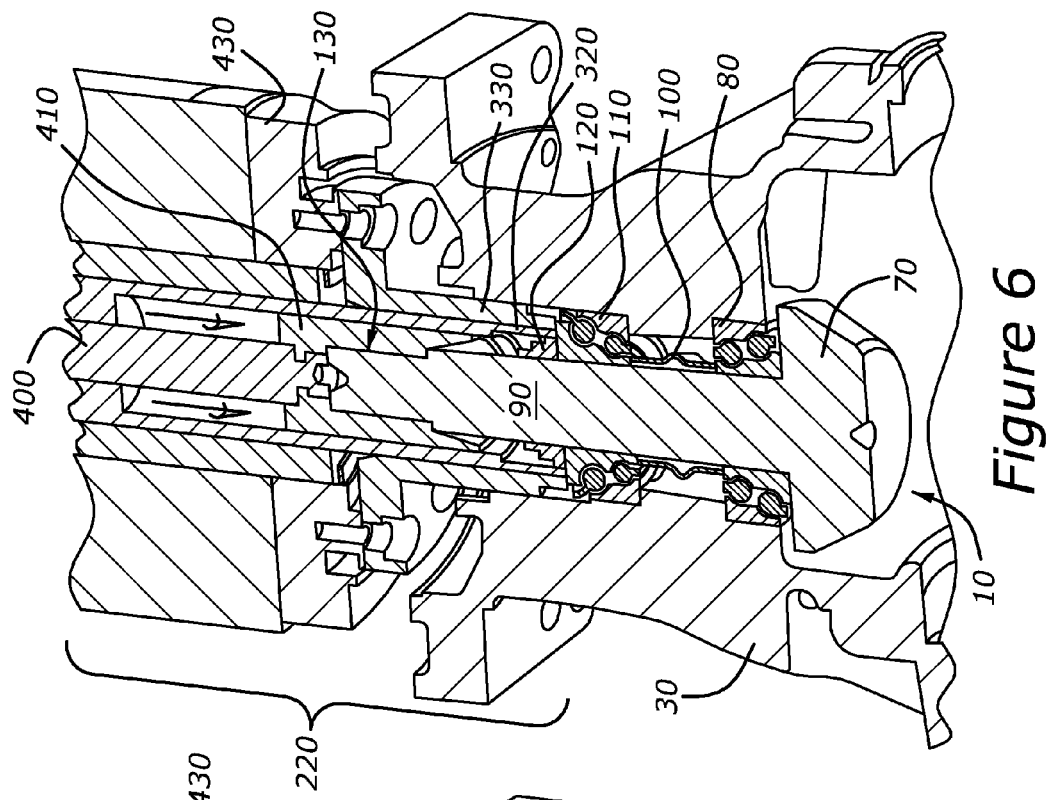
FIG. 5 is a cross-sectional perspective view of the pinion assembly preloading system of FIG. 2 in a disengaged position.

The end tooling 220, as shown in FIGS. 2-4, is linked to two drive motors 300, 310. Motor 300 is a pinion axis servo motor which prevents the pinion from rotating during loading. Motor 310 is a nut axis servo motor that tightens a pinion nut (e.g., 120 as discussed with respect to FIG. 1) during loading. The end tooling 220, as shown in FIG. 4, includes a nut socket 320 (or torque wrench fitting) configured to tighten the pinion nut journaled to one end of the pinion assembly in order to preserve adjustments to the pinion assembly post-loading. A mandrel 330 is shown journaled onto the nut socket 320. The reaction load, $F_R$, is measured by a force sensor or transducer (e.g., 430 as partially shown). The end tooling 220 is linked to two torque axes having drive motors 300, 310. The first torque axis controls pinion socket. The second torque axis controls an internal spline socket (e.g., 410 as shown in FIG. 5). The end tooling 220 includes coaxial rotary spline shafts (not shown) to drive the pinion nut socket and spline socket. An alignment coupling is included in the end tooling 220 to couple the rotary spline shaft to the pinion socket.

Press actuator 225, as shown in FIG. 4, is linked to a controller 270 configured to govern the press actuator and end tooling 220 according to a closed-loop function. In this embodiment, the controller 270 is linked to a user display or monitor 280 and keyboard 290 (as shown in FIG. 2). User display 280 is configured to indicate the reaction force and displacement of the pinion assembly during loading system operation. Several types of data can be displayed on user display 280 including, for example, reaction force, applied force, displacement, and time. Controller 270 includes actuator control logic 210 configured to cease actuation of the press actuator according to a change in the measured reaction force and displacement, thus preloading the pinion bearing assembly.

Post-preloading, while the press actuator position is being held constant, the pinion nut 120 is tightened to preserve the preloading upon tooling disengagement. In one embodiment, the nut 120 is tightened until a change (Load$_{change}$) in constant position actuator load is observed. The level of Load$_{change}$ is a function of the spacer maximum preload and a bearing-race fit preload, as recorded during the actuation of the press actuator. Controller 270 has calculator logic 350 configured to derive the Load$_{change}$ based on the measured maximum spacer preload and the bearing-race fit preload. Controller 270 has stored calculator logic for two components: 1) the load required for fitting of the bearing race onto the mating shaft—Load$_{BearingRace}$; and 2) the maximum load required to compress the collapsible spacer—Load$_{spacer}$. Therefrom a change in load (Load$_{change}$) is calculated. Once the change in load meets this calculated target the pinion nut is sufficiently tightened and the previously applied preload is preserved. The equation in the calculator logic for change in reaction force is as follows: Load$_{change}$=m×(Load$_{spacer}$−Load$_{BearingRace}$−C). In one embodiment, "m" is a constant multiplier derived from empirical studies. For example, multiplier, m, is between 0.03 and 0.08. A constant additive, C, is also empirically determined. Additive C is subtracted from the maximum spacer preload and bearing race preload. In one embodiment, C is between 100 lbs and 350 lbs.

Regression analysis can be studied to predict the bearing preloading and calculate a margin of error (or upper and lower control limits) for each force reading. By utilizing a press actuator controller with force versus distance monitoring and closed-loop control, based upon force and distance, one can subtract out the bearing-race fit and collapsible spacer force and apply the preload force directly. This technique enables the use of force directly—rather than through a surrogate measurement such as drag torque—for the key process indicator.

Controller, as shown in FIG. 4, further includes a memory 360 configured to store preloading information for a plurality of pinion assemblies. Memory 360 can be any type of random-access memory such as RAM, dynamic RAM (or DRAM), static RAM (or SRAM), one-time programmables (or OTPs), or flash drives. Controller also includes display logic (not shown) to govern textual and graphic displays from the system 200 on user display 280.

Figure 6:
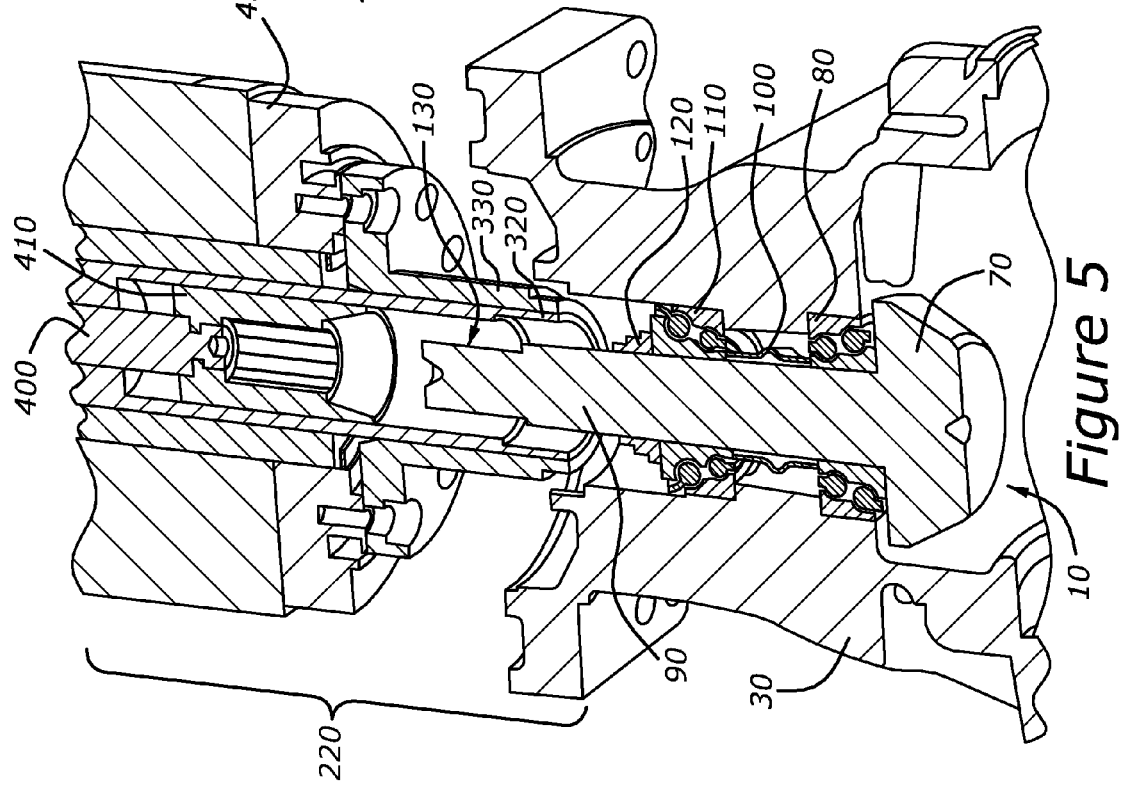
FIG. 6 is a cross-sectional perspective view of the pinion assembly preloading system of FIG. 2 in an engaged position.

Referring now to FIGS. 5-6, there is shown therein a cross-section of the system 200 with pinion assembly 10 incorporated therein. The carrier housing 30 is shown in cross-section. Carrier housing 30 is configured to encase the head 70 of the pinion assembly. The head angular contact ball bearing 80 and tail angular contact ball bearing 110 are also shown in cross-section. Bearings 80, 110 are ACBBs. Bearings 80, 110 are journaled onto the pinion shaft 90 and separated by spacer 100.

Pinion nut 120 is journaled onto the tail of pinion assembly 110, as shown in FIG. 4. The engaging end of the press actuator with nut socket 320 is also shown in cross-section. Mandrel 330 is on the outer race of the end tooling 220. The transducer 430 is also shown in cross-section proximate the mandrel 330. On the inner race is the nut socket 320 configured to mate with the pinion nut (e.g., 120 as shown in FIG. 1). The central axis of the end tooling 220 is fitted with a drive shaft 400 coupled to a spline socket 410. Spline socket 410 is configured to engage splines on the end of pinion shaft 130 to apply an anti-rotation torque during loading. Between the spline socket 410 and the pinion nut socket 320 is a series of rotary linear ball bushings (not shown).

In FIG. 5, the nut socket 320 of the pinion assembly preloading system 200, as shown in FIGS. 2-4, is in a disengaged position. Spline socket 410 is also disengaged from the pinion shaft 90. In FIG. 6, the nut socket 320 is shown in the engaged position, coupled to pinion nut 120. Spline socket 410 is coupled to the end of the pinion shaft 130.

Figure 7:
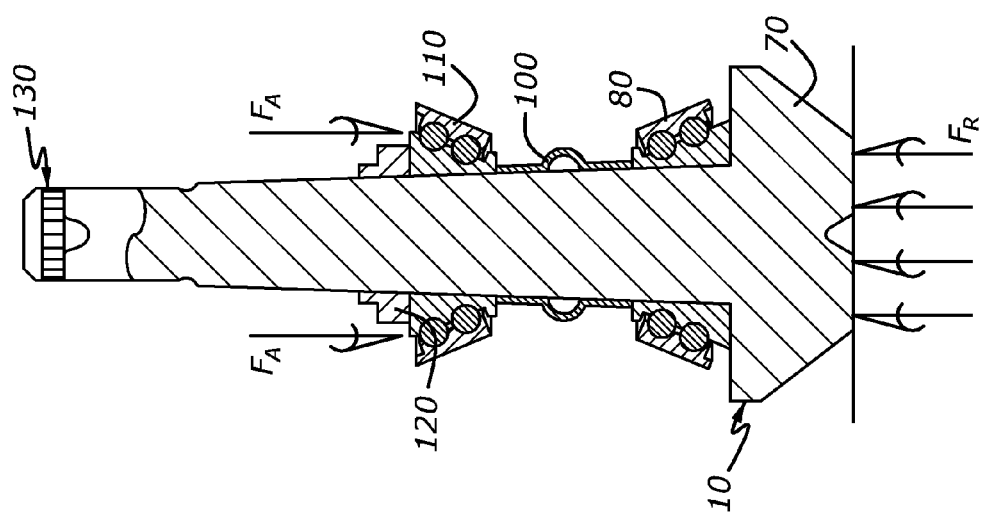
FIG. 7 is a free body diagram of the pinion assembly of FIGS. 5-6 under loading.

During actuation of the press actuator 225, the pinion assembly 10 sees axial loading as shown in the free-body diagram of FIG. 7. Shown in FIG. 7 is the free-body diagram of the pinion assembly 10 of FIGS. 5-6 removed from the pinion assembly preloading system. At the tail of the pinion shaft 130, an axial force (F$_A$) is applied by the servomotor. This force is represented as the apply load. The pinion assembly is axially aligned, with head bearing 80 adjacent the head of the pinion assembly 10. As the servomotor applies axial force (F$_A$), a reaction force (F$_R$) is seen at the head of the pinion assembly 70. In this embodiment, the reaction force, F$_R$, is measured by the force sensor or transducer (e.g., 430 as shown in FIG. 4).

Figure 8:
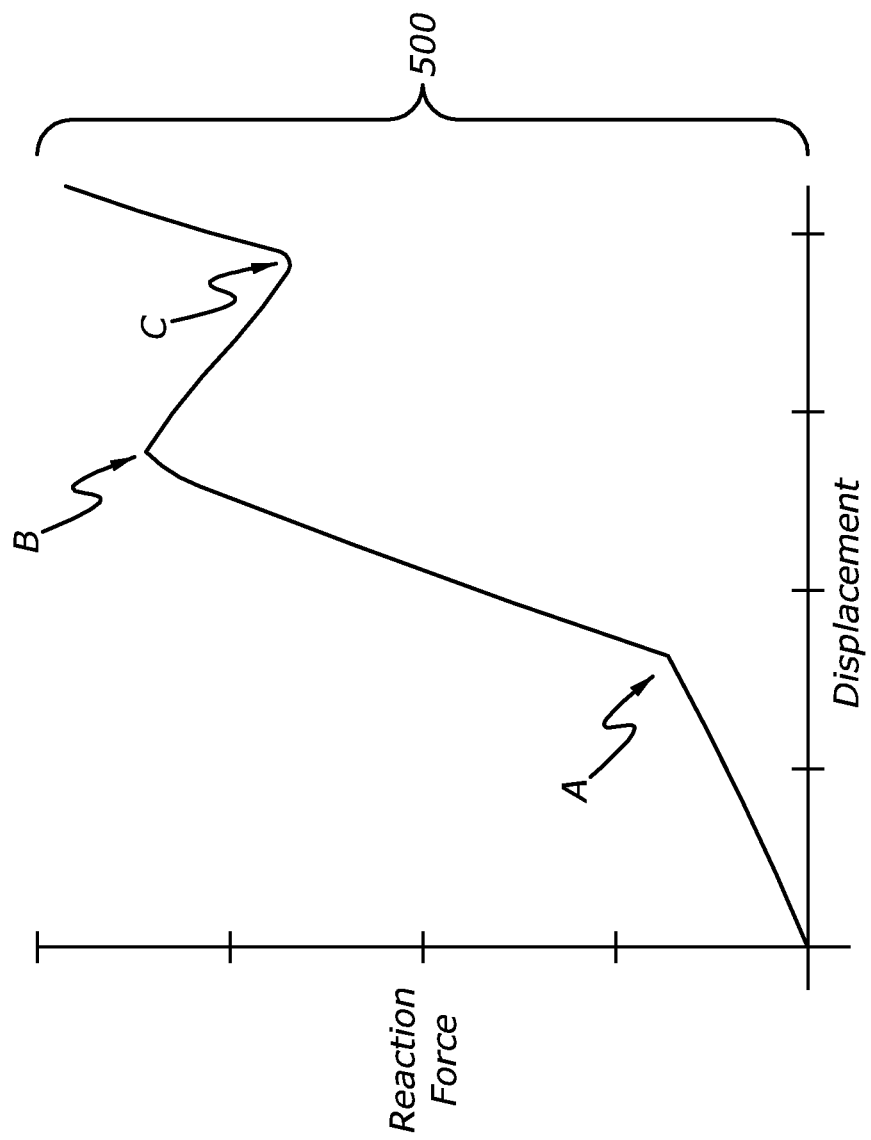
FIG. 8 is a graph of a force versus displacement curve for a pinion assembly loading process.
Figure 9:
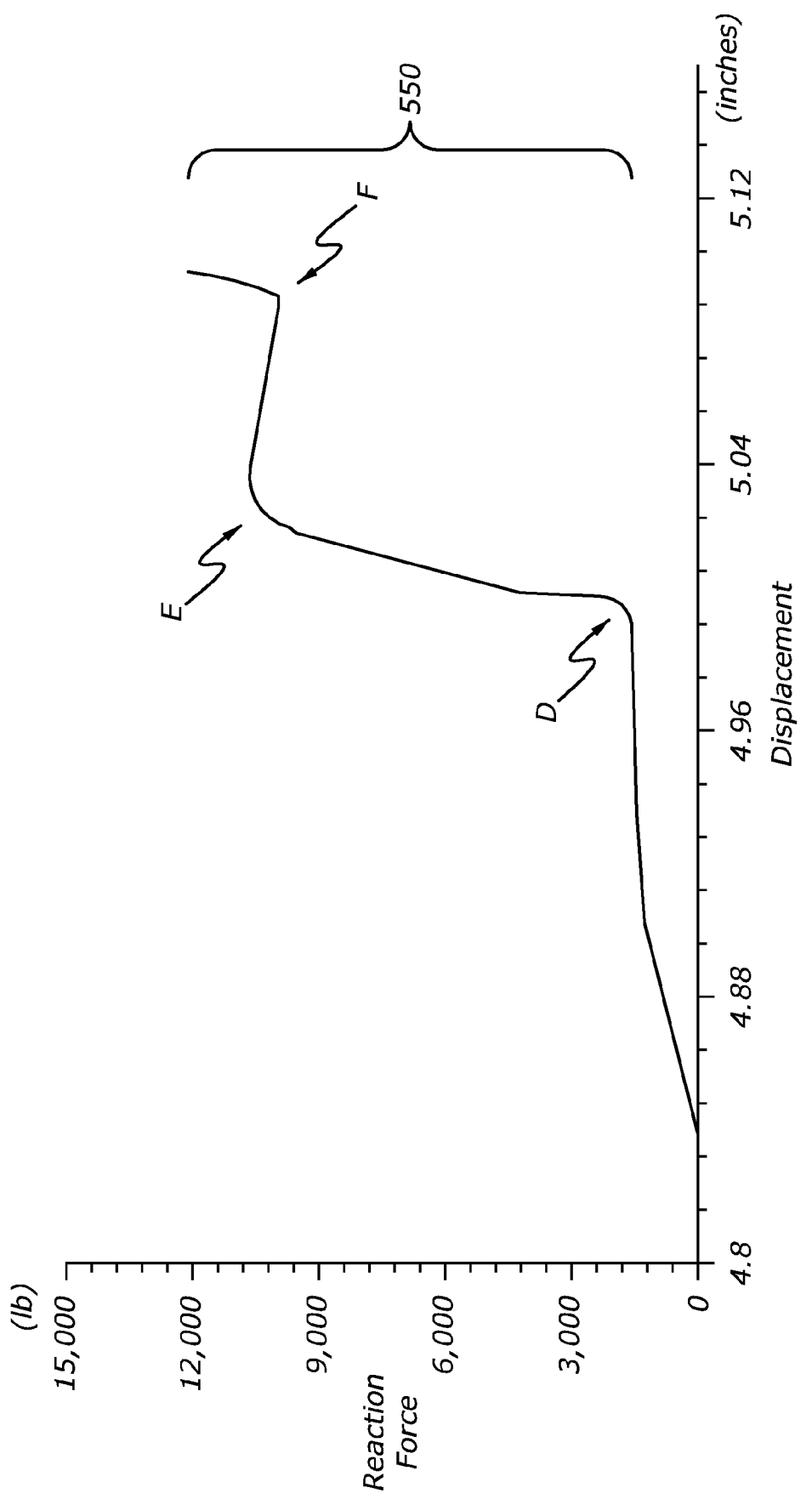
FIG. 9 is another is a graph of a force versus displacement curve for a pinion assembly loading process.

Data related to the reaction force and deformation are used to determine pinion assembly preloading, as discussed herein, for example, with respect to FIGS. 8 and 9. FIG. 8 illustrates a plot 500 of the reaction force versus bearing displacement, which is generated by an exemplary pinion assembly preloading system. On the x-axis is the linear displacement for the pinion assembly after loading has begun. On the y-axis is the reaction force at the tail of the pinion assembly, measured by the transducer (e.g. 430 as shown in FIG. 4). A system controller (e.g., 270 as shown in FIG. 4) is configured to generate the force versus displacement curve. In the plot 500 of FIG. 8 the reaction force for the pinion assembly increases in relation to the deformation. The application of this initial force leads up to the pinion tail bearing fit with respect to the pinion shaft. In this graph, point A can be defined as Load$_{BearingRace}$. As the actuator presses the tail bearing, with increasing force along the pinion stem, the pinion assembly becomes rigid and the spacer is elastically deformed. When the spacer reaches its yield point, point B, this is the maximum spacer preload or Load$_{spacer}$. The reaction force decreases until the pinion assembly becomes axially rigid, at point C. Between points B and C the collapsible spacer is plastically deforming and the reaction force drops. After point C, the bearings enter into elastic deformation or pre-loading. The net force measured after point C is the resultant load that goes into bearing preloading. Actuation of the press actuator can be stopped at the appropriate time after point C to achieve the desired pinion assembly preloading. By monitoring the displacement and the reaction force the points on the plot can be graphically or numerically detected.

FIG. 9 illustrates a plot 550 of the reaction force versus bearing displacement, which is generated by another exemplary pinion assembly preloading system. On the x-axis is the linear displacement for the pinion assembly after loading has begun in inches. On the y-axis is the reaction force in pounds. In the plot 550 of FIG. 9 the reaction force for the pinion assembly increases in proportion to the deformation. The application of this initial force leads up to the pinion tail bearing fit with respect to the pinion shaft. In this graph, point D can be defined as Load$_{BearingRace}$. As additional force is applied the pinion assembly sees additional elastic deformation of the spacer. When the spacer reaches its yield point, point E, this is the maximum spacer preload or Load$_{spacer}$. The reaction force decreases until the pinion assembly becomes axially rigid, at point F. Between points E and F the collapsible spacer is plastically deforming and the reaction force changes. After point F, the bearings enter into elastic deformation or pre-loading. The net force measured after point F is the resultant load that goes into bearing preloading. Actuation of the press actuator can be stopped at the appropriate time after point F to achieve the desired pinion assembly preloading.

Some of the exemplary embodiments disclosed are configured to control actuation of a press actuator according to information derived from the force versus displacement plot as several indicia on the plot can be used to determine the point of spacer yield and desired pinion assembly preloading. In one embodiment, the controller is configured to read the force versus displacement plot to determine the reaction force measured. Once the reaction force meets a predetermined limit it is determined that the pinion assembly has been sufficiently preloaded. In sequence the preloading system is loaded and the measured levels of points A and B (or D and E, as shown in FIGS. 8-9, respectively) are monitored and stored. While coming to a stop at point C/F plus a set value, e.g., 2000 lbs. That position is held and the system begins to tighten the nut. While the nut is "free spinning" the load at the end position remains constant. As soon as the nut begins to contact the tail bearing assembly the monitored load begins to drop off.

In another embodiment, a controller is configured to read the force versus displacement plot to determine bearing preloading by monitoring the slope of the curve. As shown in FIGS. 8-9, the slope of the force versus deformation plot represents the rate of change in reaction force over distance. This rate or slope is substantially higher after the pinion assembly becomes solid, i.e., after point C. The slope of the force versus displacement plot serves as other indicia of bearing preloading. In this embodiment, the controller can be configured to cease actuation of the press actuator once the slope of the curve is greater than a predetermined slope (e.g., 270,000 lb/in).

In yet another embodiment, a controller is also configured to read the force versus deformation plot to determine bearing preloading by monitoring the change in the slope of the curve. As shown in FIG. 8-9, the slope of the force versus displacement plot changes as displacement and the reaction force increases. The change in slope of the force versus displacement plot serves as another indicator of bearing preloading. In this embodiment, the controller can be configured to cease actuation of the press actuator once the slope of the curve changes more than a predetermined number of times (e.g., 3 or more times). Hysteresis can be programmed into the control logic to exclude normal system fluctuations. For example, as error checking, the system can cease actuation of the axial force where a reaction force is sensed more than a predetermined number of times. Regression analysis can be studied to calculate a margin of error or upper and lower control limits for force readings.

As taught above, the disclosure includes a method of preloading pinion bearing assemblies and can be used with vehicle drive axle pinion bearing assemblies or any type of shaft or spindle that incorporates a preload bearing assembly. One embodiment of the method includes the steps of: applying an axial force to a pinion assembly (e.g., with a press actuator 225 as shown in FIGS. 2-4); assessing a reaction force at the pinion assembly (e.g., with a transducer 430 as shown in FIG. 4); assessing a bearing assembly displacement; and ceasing application of the axial force based on a change in reaction force. The method can be executed by the pinion assembly preloading system(s) discussed above. The systems include controllers, which can be any type of microcontroller with algorithms programmed on read-only memory (or ROM), RAM or flash memory.

In one embodiment, the method includes the step of measuring a bearing-race preload; measuring a maximum spacer preload; and ceasing application of the axial force according to an equation for the change in reaction force. In this embodiment, the change in reaction force is equal to the sum of the spacer preload minus the bearing-race preload minus a constant, multiplied times a multiplier.

The controller can, for example, include a graphics controller to display information such as the force versus deformation plot on a user display or screen. In another embodiment, the method includes: assessing a slope of a reaction force versus displacement plot (as discussed for example with respect to FIGS. 8-9). The controller can be configured to cease the application of the axial force when the slope of the reaction force versus displacement plot exceeds a predetermined threshold, e.g., 11,000 lb/in. In another embodiment, the method includes: ceasing the application of the axial force after a predetermined number of changes in the slope of the reaction force versus displacement plot.

A change in reaction force can be quantified using displacement or other system characteristics. For example, in one exemplary embodiment of a system for preloading a pinion bearing assembly change in reaction force is measured temporally. A timer is linked to the system controller to measure changes in reaction force over time. An application force is applied according to an algorithm. The application force can be constantly increasing or increase at a changing rate. Changes in the reaction force provide an indication as to pinion assembly loading. The rate-of-change or slope of the reaction force versus time plot can be used as one indicator of pinion assembly preloading. Or a regression equation can be developed by designing an experiment for a relationship between the reaction force and time.

While the best modes for carrying out the invention have been described in detail, those familiar with the art to which this invention relates will recognize various alternative designs and embodiments for practicing the invention within the scope of the appended claims.

The invention claimed is:

1. A method of preloading a pinion assembly, comprising:
applying an axial force to a pinion assembly;
detecting an axial reaction force at the pinion assembly;
assessing a bearing assembly displacement;
ceasing application of the axial force based on a change in the axial reaction force; and
wherein the axial reaction force is measured by a force sensor detecting the axial reaction force of a mandrel pressing axially onto a tail bearing of the pinion assembly.

2. The method of claim 1, further comprising:
measuring a bearing-race preload;
measuring a spacer preload;
ceasing application of the axial force according to an equation for the change in axial reaction force, the change in axial reaction force equal to a sum of the spacer preload minus the bearing-race preload minus a constant, multiplied times a multiplier.

3. The method of claim 1, further comprising:
assessing a slope of an axial reaction force versus displacement plot.

4. The method of claim 3, further comprising:
ceasing the application of the axial force when the slope of the axial reaction force versus displacement plot exceeds a predetermined threshold.

5. The method of claim 1 wherein the axial force is initially applied while not rotating a pinion shaft relative to a pinion nut.

6. The method of claim 5 further including threadably tightening the pinion nut on the pinion shaft after applying the axial force to preserve a bearing preload created by the application of the axial force.

7. The method of claim 1 further including threadably tightening a pinion nut on a pinion shaft after applying the axial force to preserve a bearing preload created by the application of the axial force.

8. The method of claim 7 further including:
applying the axial load to the pinion assembly using a servo motor;
rotationally tightening the pinion nut on the pinion shaft using a drive motor.

9. The method of claim 1 further including securing a spline socket onto an end of the pinion assembly, preventing a pinion shaft of the pinion assembly from rotating during application of the axial force.

10. The method of claim 1 further including:
locating a nut socket concentrically within the mandrel;
rotationally driving a pinion nut onto a pinion shaft with the nut socket after the mandrel completes axially displacing the tail bearing, to maintain a predetermined bearing preload.

11. The method of claim 1 further including:
assessing a slope of an axial reaction force versus displacement plot;
ceasing actuation of the axial force after a predetermined number of changes in the slope of the plot.

12. A method of preloading a pinion assembly, comprising:
applying an axial force to a pinion assembly while not rotating a pinion shaft relative to a pinion nut;
detecting an axial reaction force at the pinion assembly;
assessing a bearing assembly displacement;
ceasing application of the axial force based on a change in the axial reaction force; and
threadably tightening the pinion nut on the pinion shaft after applying the axial force to preserve a bearing preload created by the application of the axial force.

13. The method of claim 12 further including:
locating a nut socket concentrically within a mandrel;
rotationally driving the pinion nut onto the pinion shaft with the nut socket after the mandrel completes axially displacing a tail bearing of the pinion assembly, to maintain a predetermined bearing preload.

14. The method of claim 12 wherein the axial reaction force is measured by a force sensor detecting the axial reaction force of a mandrel pressing axially onto a tail bearing of the pinion assembly.

15. The method of claim 12 further including:
assessing a slope of an axial reaction force versus displacement plot;
ceasing actuation of the axial force after a predetermined number of changes in the slope of the plot.

16. The method of claim 12 further including:
assessing a slope of an axial reaction force versus displacement plot;
ceasing the application of the axial force when the slope of the axial reaction force versus displacement plot exceeds a predetermined threshold.

17. A method of preloading a pinion assembly, comprising:
applying an axial force to a pinion assembly;
detecting an axial reaction force at the pinion assembly;
assessing a bearing assembly displacement;
assessing a slope of an axial reaction force versus displacement plot;
ceasing application of the axial force based on the slope of the plot.

18. The method of claim 17 further comprising:
ceasing the application of the axial force when the slope of the axial reaction force versus displacement plot exceeds a predetermined threshold.

\* \* \* \* \*